United States Patent
Ma et al.

(10) Patent No.: US 7,992,111 B1
(45) Date of Patent: Aug. 2, 2011

(54) CONVERSION OF A HIGH-LEVEL GRAPHICAL CIRCUIT DESIGN BLOCK TO A HIGH-LEVEL LANGUAGE PROGRAM

(75) Inventors: Haibing Ma, Superior, CO (US); Jingzhao Ou, Sunnyvale, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 241 days.

(21) Appl. No.: 12/467,678

(22) Filed: May 18, 2009

(51) Int. Cl.
*G06F 9/45* (2006.01)

(52) U.S. Cl. ........ 716/103; 716/101; 716/102; 716/104; 716/111; 716/139

(58) Field of Classification Search .......... 716/101–106, 716/111, 139
See application file for complete search history.

(56) References Cited

U.S. PATENT DOCUMENTS

| | | | | |
|---|---|---|---|---|
| 7,207,015 B1* | 4/2007 | Ballagh et al. | ................ | 716/103 |
| 7,509,246 B1* | 3/2009 | Molson et al. | .................. | 703/13 |
| 7,680,636 B2* | 3/2010 | Kanapka et al. | ................... | 703/2 |
| 7,698,668 B2* | 4/2010 | Balasubramanian et al. | | 716/106 |
| 7,774,172 B1* | 8/2010 | Yunt et al. | ........................ | 703/2 |
| 7,882,462 B2* | 2/2011 | Ogilvie et al. | ................ | 716/103 |
| 2005/0246712 A1* | 11/2005 | Ferris | ............................. | 719/310 |
| 2006/0064670 A1* | 3/2006 | Linebarger et al. | ........... | 717/106 |
| 2007/0124706 A1* | 5/2007 | Kolpekwar et al. | ............... | 716/1 |
| 2007/0157138 A1* | 7/2007 | Ciolfi et al. | ....................... | 716/4 |
| 2007/0157162 A1* | 7/2007 | Ciolfi | ............................ | 717/105 |
| 2008/0098349 A1* | 4/2008 | Lin et al. | ....................... | 717/106 |

* cited by examiner

*Primary Examiner* — Paul Dinh
*Assistant Examiner* — Nha T Nguyen
(74) *Attorney, Agent, or Firm* — LeRoy D. Maunu; Lois D. Cartier

(57) ABSTRACT

Approaches for processing an electronic circuit design. In one embodiment, the graphical model of an outer subsystem block and an inner subsystem block are translated into a high-level language (HLL) program. The HLL program includes a specification of a first function corresponding to the outer subsystem block and within the specification of the first function a specification of a second function corresponding to the inner subsystem block. The specification of the first function references a parameter of the outer subsystem block and specifies invocation of the second function. The specification of the second function specifies invocation of a third function corresponding to a leaf block in the inner subsystem block. The specification of the first function references a variable corresponding to the parameter, and that variable is referenced by the second or third functions. Execution of the HLL program instantiates a model of the design.

15 Claims, 5 Drawing Sheets

CONVERSION OF A HIGH-LEVEL GRAPHICAL CIRCUIT DESIGN BLOCK TO A HIGH-LEVEL LANGUAGE PROGRAM

FIELD OF THE INVENTION

The present invention generally relates to tools for preparing electronic circuit designs.

BACKGROUND

Electronic circuit designs may be prepared using any of a variety of approaches. In one approach, the designer creates a graphical model of the system using a tool such as the System Generator for DSP from XILINX®, Inc., which enables use of the SIMULINK® model-based environment from The MATHWORKS®. These types of tools provide a graphical user interface (GUI) for preparing, simulating, and even implementing a circuit design. Basic building blocks are instantiated, connected, and combined into larger blocks of the design via the GUI. Each block generally has at least one input signal, at least one output signal, and an equation that defines the relationship between the input and output signals.

In another approach, a design can be specified in a hardware description language (HDL) such as VHDL or Verilog. In an HDL approach versus the GUI approach, the designer has a greater level of control over the eventual implementation. However, when using an HDL the designer may sacrifice the benefits associated with the ability to abstract the design at a high level as provided by a GUI approach.

A scripting language such as MATLAB provides a higher level of abstraction for creating a design than does an HDL. A scripting language supports flexible parameterization through which, for example, components of a design may be easily scaled for different applications. However, scripting languages may be cumbersome for quickly assembling components of a circuit design. Other high-level programming languages such as JAVA™, JAVASCRIPT™, C++, and Tcl (Tool Command Language), are also sometimes used to create circuit designs. However, developing circuit designs using these languages has the same drawbacks as using MATLAB.

SUMMARY

The various embodiments of the invention provide methods and apparatus for processing an electronic circuit design by a computing arrangement. In one embodiment, a method includes inputting a graphical model of an outer subsystem block of the design. The outer subsystem block includes at least one parameter and at least one inner subsystem block. The inner subsystem block includes at least one leaf block that specifies a function for applying to an input port value and producing an output port value. The graphical model of the outer subsystem block and the inner subsystem block is translated into a high-level language (HLL) program by the computing arrangement. The HLL program includes a declaration and specification of a first function corresponding to the outer subsystem block and within the specification of the first function a declaration and specification of a second function corresponding to the inner subsystem block. The specification of the first function references the at least one parameter and specifies invocation of the second function. The specification of the second function specifies invocation of a third function corresponding to the leaf block. The specification of the first function references at least one variable corresponding to the at least one parameter. The at least one variable is referenced by at least one of the second and third functions. The HLL program is executable to instantiate a model of the outer subsystem block, the inner subsystem block, and the leaf block consistent with an input value for the at least one parameter.

In another embodiment, a system is provided for processing an electronic circuit design. The system includes a processor arrangement coupled to a memory arrangement. The memory arrangement is configured with instructions that are executable by the processor arrangement for performing the operations including inputting a graphical model of an outer subsystem block of the design. The outer subsystem block includes at least one parameter and at least one inner subsystem block. The inner subsystem block includes at least one leaf block that specifies a function for applying to an input port value and producing an output port value. The graphical model of the outer subsystem block and the inner subsystem block is translated into a high-level language (HLL) program. The HLL program includes a declaration and specification of a first function corresponding to the outer subsystem block and within the specification of the first function a declaration and specification of a second function corresponding to the inner subsystem block. The specification of the first function references the at least one parameter and specifies invocation of the second function. The specification of the second function specifies invocation of a third function corresponding to the leaf block. The specification of the first function references at least one variable corresponding to the at least one parameter. The at least one variable is referenced by at least one of the second and third functions. The HLL program is executable to instantiate a model of the outer subsystem block, the inner subsystem block, and the leaf block consistent with an input value for the at least one parameter.

An article of manufacture is provided in another embodiment. The article of manufacture includes a storage device configured with executable instructions for processing an electronic circuit design. The instructions when executed by one or more processors cause the one or more processors to perform operations including inputting a graphical model of an outer subsystem block of the design. The outer subsystem block includes at least one parameter and at least one inner subsystem block. The inner subsystem block includes at least one leaf block that specifies a function for applying to an input port value and producing an output port value. The graphical model of the outer subsystem block and the inner subsystem block is translated into a high-level language (HLL) program. The program includes a declaration and specification of a first function corresponding to the outer subsystem block and within the specification of the first function a declaration and specification of a second function corresponding to the inner subsystem block. The specification of the first function references the at least one parameter and specifies invocation of the second function. The specification of the second function specifies invocation of a third function corresponding to the leaf block. The specification of the first function references at least one variable corresponding to the at least one parameter. The at least one variable is referenced by at least one of the second and third functions. The HLL program is executable to instantiate a model of the outer subsystem block, the inner subsystem block, and the leaf block consistent with an input value for the at least one parameter.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
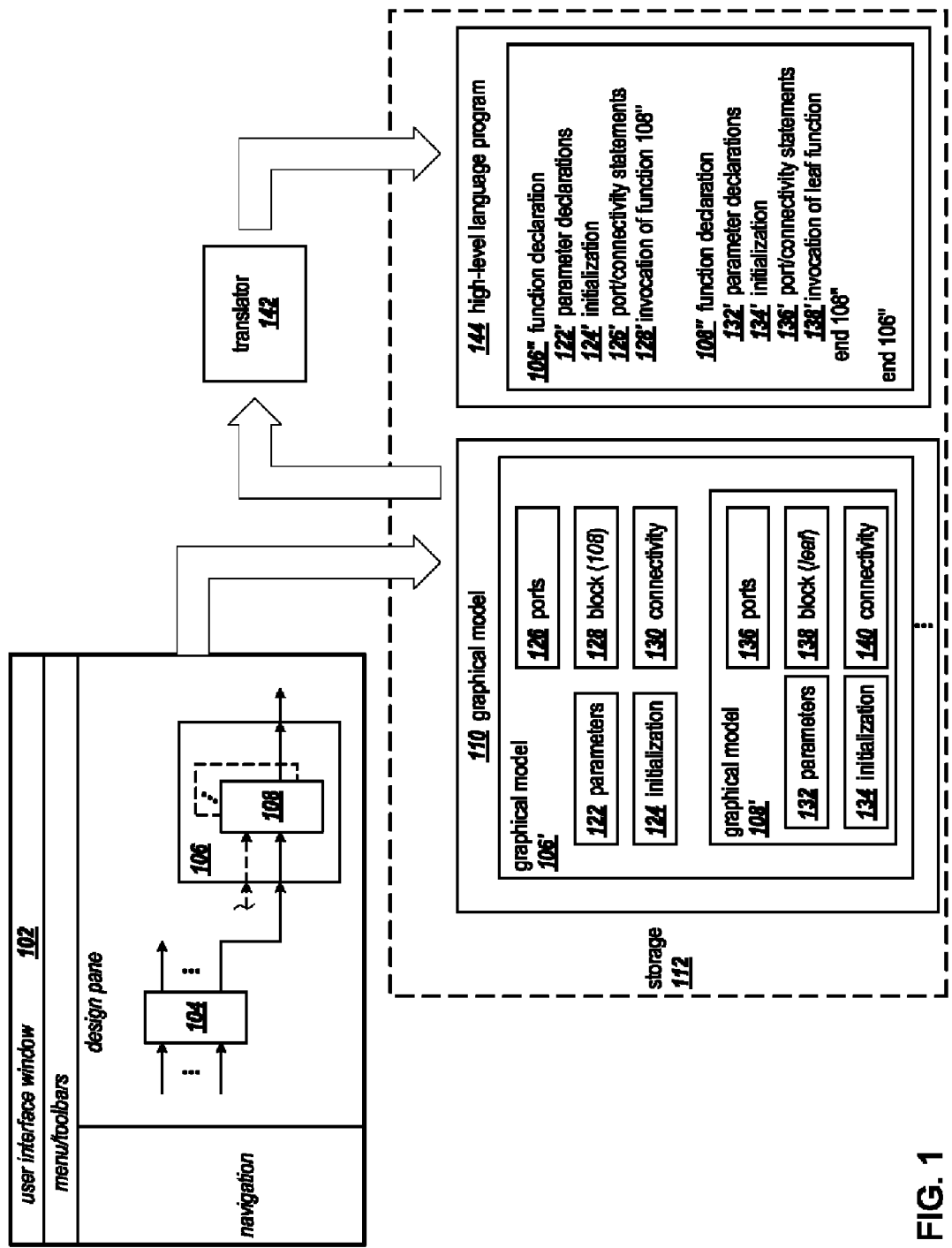
FIG. 1 shows a GUI interface and an example graphical outer subsystem and inner subsystem which are translated from a graphical model into an HLL program.

A GUI-based modeling system allows a designer to easily abstract and assemble different parts of a design. However, for designs that contain hundreds to thousands of blocks, and for designs for which the number of blocks and connections change subject to design parameters, it may be more straightforward for the designer to specify the design and define the parameters that control the numbers of blocks and connections with a script-based specification than with a GUI-based system.

One embodiment of the invention converts a graphical model of a circuit design block into a scripting language. For example, a designer may create a graphical model of a circuit design block in the SIMULINK modeling system and translate that graphical model into a script in the MATLAB language. Other embodiments convert the graphical model into a high-level language (HLL) program such as C or C++, for example.

The ability to convert the graphical model into a script benefits the designer because the designer can quickly create a model for a design block using the GUI-based system, convert that model to a script, and then adapt that script to satisfy further design objectives. For example, the designer may further adapt the generated script for use in combination with other scripts and further parameterize the script to allow specifying various numbers of instances of the originally specified model for different applications. The generated script may also be incorporated into a script that specifies a larger design.

In one embodiment, when executed, the generated HLL program generates a graphical model of the design. For example, where a SIMULINK graphical model is translated into a MATLAB script, if the generated MATLAB script is executed the output is a graphical model that is equivalent to the graphical model from which the MATLAB script was generated. This capability is useful for parameterizing a design by way of adapting the generated script rather than editing the design via a GUI. For example, the blocks in a graphical model have associated parameters that may be modified by way of a GUI in order to customize the model for a particular design. However, the GUI may require that the designer individually edit each instance of the block in order to change a parameter value for that block. In contrast, the generated script may be adapted to use an single input parameter value to make the same customization. Running the adapted script with the input parameter value produces a graphical model with the desired customization.

The expressive power of an HLL program renders it more suitable to parameterization than does a graphical model and GUI interface. For example, control statements may be used in an HLL program for customizing a design based on input parameter values. Such control statements include if-then-else conditional statements and for-loop control statements. These control statements may be used in the HLL program to control the how input parameter values are applied in generating a design from execution of the script.

In addition to parameterization, the generated and adapted script may be used with other tools and also used with the original GUI-based modeling system. In one example, the generated script may be compiled into HDL and netlisted using tools such as CoreGen from XILINX. In another example, the generated and adapted script may be combined with a GUI-based model, such as with the "S-function" capability provided by SIMULINK.

The time required to simulate a design may be reduced by converting a selected graphical block to a script. In the graphical model, an outer subsystem may contain a number of inner subsystems, which together define the operation of the outer subsystem. The outer subsystem and inner subsystems are represented as nested blocks. In simulating with the graphical model the simulator initializes, queries, and updates the states of all the inner subsystems as well as the outer subsystem. By converting the outer subsystem and the contained inner subsystems to a script the simulator would have to manage only a single block which represents the outer subsystem and the inner subsystems rather than all the blocks of the original outer subsystem and inner subsystem graphical model.

FIG. 1 shows a GUI interface and an example graphical outer subsystem and inner subsystem which are translated from a graphical model into an HLL program. The example user interface window 102 includes a design pane in which a portion of an example electronic circuit design is displayed. The portion of the example design is shown as having graphical objects 104, 106, and 108. Graphical object 106 is used to illustrate the translation of an underlying graphical model into an HLL program.

In the description below, the following terminology is employed. A "graphical object" refers to the graphical rendering of a component of a design as displayed to a designer. An abstract view of the circuit design is that the design is comprised of functional or logic "blocks," each performing the designated function. A "graphical model" refers to the stored data that defines a block of the design, including data for rendering a graphical object. The function of a block may be provided by one or more blocks nested within that block. If the details of the nested blocks are not important to the designer, the designer may choose to view the block containing the nested blocks without viewing the nested blocks. The term "outer subsystem" refers to a block that contains nested blocks, and each nested block may be an "inner subsystem" of the outer subsystem. A block is a subsystem if it contains any nested blocks or a block is a leaf it does not contain any nested blocks. "Block" may sometimes be used as shorthand to reference a graphical object, the underlying graphical model, a subsystem or a leaf.

The graphical object 106 depicts an outer subsystem as defined by graphical model 106' in storage 112, and the graphical object(s) 108 depicts an inner subsystem as defined by the graphical model 108'. The graphical model 106' is part of graphical model 110, which includes other parts of the overall electronic circuit design. Each graphical model 106' and 108' includes a set of attributes that define the model. The attributes include parameters, initialization commands, ports, blocks, and connectivity. For graphical model 106', the attributes are shown as parameters 122, initialization commands 124, ports 126, blocks 128, and connectivity 130.

Parameter attributes 122 are used in configuring the graphical model 106'. For example, the parameter attributes may include variable names and values which are evaluated at the time the graphical model is compiled into a simulation model. Example parameters include values for constants used in the function specified by the graphical model.

The initialization attributes 124 include commands which are optionally established by a designer. The commands may be used to establish an initial state for the graphical model when that model is opened for simulation.

The ports attributes 126 specify characteristics of the ports of the block specified by the graphical model 106'. Such characteristics include the names and directions (input or output) of the ports.

The block attributes 128 specify each block that is nested within graphical model 106'. In the example, the block 106 is shown as including one or more blocks 108. The nested block 108 provides some part of the overall function of block 106. Thus, the block attributes 128 of graphical model 106' specify that block 108 is nested within block 106. It will be appreciated that graphical model 106' specifies that block 106 is an inner subsystem of the block defined by graphical model 110. Thus, the block (not shown) defined by graphical model 110 is an outer subsystem relative to block 106'.

The connectivity attributes 130 specify the connections between the blocks specified by the blocks attributes 128 as well as the connections to the ports specified by the ports attributes 126. Values for the parameters and the initialization commands may be specified by a designer using editing windows such as the examples shown in FIGS. 2 and 3.

Graphical model 108' specifies the attributes of block 108, which is nested within block 106. The nested relationship is shown as graphical model 108' being contained by graphical model 106'.

The graphical model 108' includes parameter attributes 132, initialization attributes 134, ports attributes 136, block attributes 138, and connectivity attributes 140 as described above for the graphical model 106'.

According to embodiments of the inventions, in response to a designer selecting a particular graphical model and invoking a translator 142, the selected graphical model is read from storage 112 and translated into an HLL program 144. The HLL may be a scripting language or a language for which program code is typically interpreted or compiled and executed. The generated HLL program 142 has a structure that corresponds to the hierarchical relationship between the components of the translated model. For example, the graphical model 106', which contains the graphical model 108', is translated into a function in the HLL program which begins with the function declaration 106". The function specification 106" includes parameter declarations 122' for the parameter attributes 122 of the graphical model 106', initialization statements 124' that implement the initialization commands 124, port and connectivity statements 126' that implement the port attributes 126 and connectivity attributes 130, and a statement 128' that invokes a function corresponding to the block 108, which is specified by the block attributes 128.

The graphical model 108' is translated into a function that is specified within the scope of function 106" in the HLL program 144. The specification of the function for graphical model 108' begins with the function declaration 108" and includes statements 132', 134', 136', and 138', which correspond to the attributes of graphical model 108 and are similar to the statements in function 106".

In the example program 144, function 108" is shown as being declared within the scope of function 106" by way of it being specified before the end 106" statement. Parameters referenced by function 106" can be referenced by function 108", which reflects the scope of parameter attributes 122 of graphical model 106' being visible within graphical model 108'.

The HLL program code in Example 1 below illustrates an example translation of a graphical model. The example code is a script in the MATLAB language. There are elements in the example script that correspond to code that would be generated from the graphical model 106' of FIG. 1. However it will be recognized that script in Example 1 reflects characteristics of a graphical model beyond those of graphical model 106'. In particular, the declared inner_subsystem invokes the xBlock function twice for instantiating two constant multipliers, with the output of the first constant multiplier connected to the input of the second constant multiplier.

```
function outer_subsystem(a, b)
  % initialization commands
  c=a+b;
  in=xInport('in');
  out=xOutport('out');
  xBlock(str2func('inner_subsystem'), {a, b});
  function inner_subsystem(a, b)
    % mask initialization
    d1=c*2+a;
    d2=c*3+b;
    in=xInport('in');
    out=xOutport('out');
    % create a signal object which can
    % connect two blocks
    sig=xSignal( )
    % create a const mult,
    % connect subsystem input port 'in'
    % to the input port of const mult
    % connect signal 'sig'
    % to the output port of const mult
    xBlock('Constant Multiplier', . . .
      {'const', d1}, . . .
      {in}, . . .
      {sig});
    % create another const mult 2,
    % connect signal 'sig'
    % to the input port of const mult 2
    % connect subsystem input port 'out'
    % with the output port of const mult
    xBlock('Constant Multiplier', . . .
      {'const', d2}, . . .
      {sig}, . . .
      {out});
  end % function inner_subsystem
end % function outer_subsystem
```

Example 1

The outer_subsystem function corresponds to graphical model 106'. The inner_subsystem function is declared and defined within the definition of the outer_subsystem function (before the "end" statement for the outer_subsystem). Thus, the inner_subsystem function is nested within the outer_subsystem function, much as function 108" is nested within function 106" in FIG. 1, which allows the inner_subsystem function to reference parameters of the outer_subsystem function. For example, parameters a, b, and c, which are declared in the outer_subsystem function, are referenced in the inner_subsystem function.

For a scripting language such as MATLAB, type declaration are not required for the variables. However, those skilled in the art will recognize that if the target HLL is strongly typed, as are C++ and Java, each variable would be declared with a type. In a strongly-typed language, the "in" in Example 1 would be declared as a type xInport, "out" would be declared as a type xOutport, "sig" would be declared as a type xSignal, and parameters a and b would be the type double. The types, xInport, xOutport, and xSignal would be custom defined for use in generating the desired model from the executed program.

The comments in the script designate the initialization commands for the outer_subsystem and for the inner_subsystem.

The following statements:
in=xInport('in');
out=xOutport('out');
are generated from the port attributes of the graphical model. Note that the outer_subsystem and the inner_subsystem both have these port statements.

The statement, xBlock(str2func('inner_subsystem'), {a, b}); invokes the inner_subsystem function and is generated based on the block attributes of the graphical model of the outer_subsystem. That is, the block attributes of the outer_subsystem will identify the inner_subsystem as a constituent block of the outer_subsystem.

A block that does not contain any nested blocks is a leaf block as noted above. The function that is specified for a leaf block is that which generates a graphical model of that same leaf block when that function is invoked in executing the HLL program. The following HLL statement from Example 1 is that generated from a leaf block in a graphical model:

xBlock('Constant Multiplier', . . .
  {'const', d1}, . . .
  {in}, . . .
  {sig});

When the xBlock function is called with values for the specified parameters, the output is a graphical model for the constant multiplier block. Thus, the predefined xBlock function instantiates a leaf block in the graphical model, with the leaf block being a constant multiplier as specified with the parameter to xBlock. The xBlock function is programmed to generate a graphical model that is compliant with the underlying graphical modeling system, for example, SIMULINK.

Based on the connectivity attributes of the graphical model corresponding to the inner_subsystem function, the function is specified with a statement to instantiate the signal (sig=xSignal( ). The signal named sig, connects the output of the first constant multiplier to an input of the second constant multiplier, where the constant multipliers are instantiated with the calls to xBlock('Constant Multiplier', . . .

The generated HLL program is distinguished from the graphical model in that the graphical model does not support parameterizing the model by way of adding programmatic control flow. For example, the script in Example 1 could be supplemented with a for loop which contains the xBlock ('Constant Multiplier', . . . statement, where the for loop iterates some number of times based on an input parameter value. When the supplemented script is executed with the parameter value of the for loop, a chain of constant multipliers is instantiated in the design. Whereas with the GUI interface the designer would have to manually instantiate and connect the desired number constant multipliers in the chain, with the supplemented script the designer need only input the desired parameter value.

Figure 2:
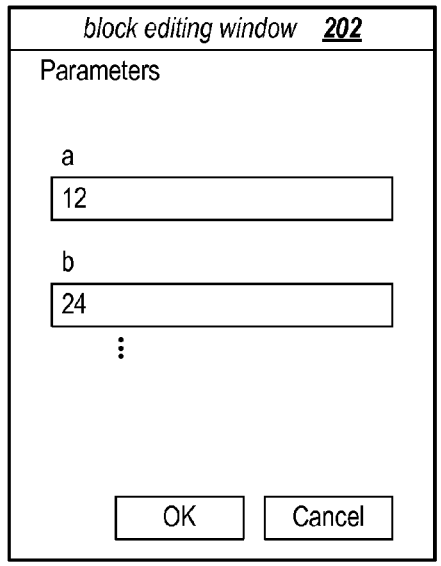
FIG. 2 is a user interface window in which parameter values have been set for input parameters of a block.
Figure 3:
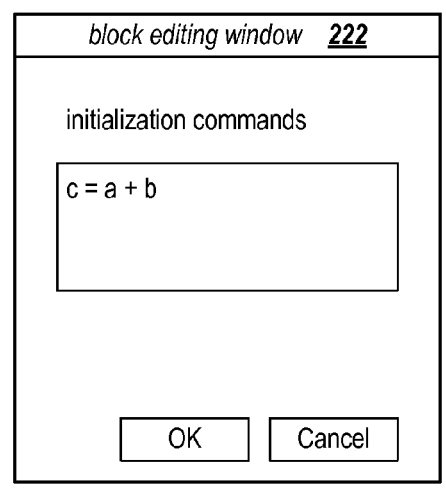
FIG. 3 is a user interface window in which an initialization command has been specified for a block.
Figure 4:
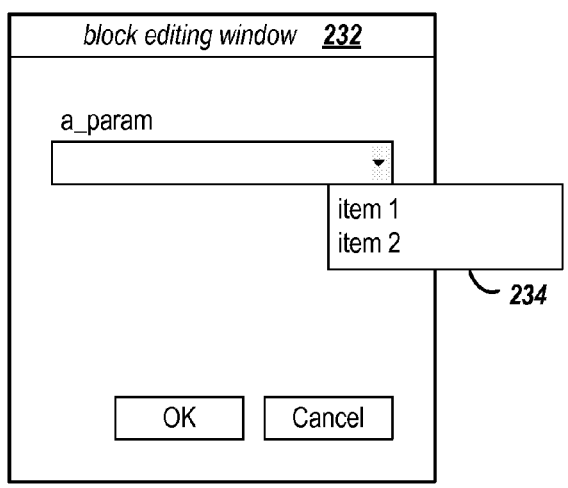
FIG. 4 is a user interface window in which a drop-down menu allows a designer to select a value for a parameter.

FIGS. 2, 3, and 4 illustrate various attributes of an example graphical model that may be specified for a block of a design.

FIG. 2 is a user interface window 202 in which parameter values have been set for input parameters a and b of a block. For example, the parameters a and b may be the parameters of the graphical model 106' (FIG. 1). For graphical model 106', the parameter values entered via window 202 would be stored as parameter attributes 122.

The HLL program code generated from the parameters 122 includes statements that assign to parameters a and b those values the user specified in the window 202. In the HLL code of Example 1, before the statement that invokes the outer_subsystem function, the following statements: a=12; and b=24; would be specified in the generated HLL program code. Thus, when the outer_subsystem function is invoked in the HLL program (not shown in Example 1), the a and b parameters, which are input to the outer_subsystem function, would have the desired values.

FIG. 3 is a user interface window 222 in which an initialization command has been specified for a block. In the example, the designer has specified the following initialization command: c=a+b. The example initialization command assigns the sum of parameters a and b to the variable c. If this command is specified in the graphical model 106', when translated into HLL code, the generated code includes an HLL statement that is equivalent to the initialization command. For example, in the HLL code in Example 1, the statement, c=a+b, is specified in the outer_subsystem function. The initialization statement is inserted in the HLL program after the declaration of the function generated from the graphical model and before statements in the HLL program that reference the result of the statement, for example, before a statement that references the variable, c.

FIG. 4 is a user interface window in which a drop-down menu allows a designer to select a value for the parameter a_param. The permitted parameter values for a_param are "item 1" and "item 2" as shown by the drop-down menu. If the user has not specified either of "item 1" or "item 2" as the parameter value for a_param in the GUI editing window 232, then when the HLL program code is generated from the graphical model (not shown) having a_param as a parameter, the translator (FIG. 1, 142) generates program code for performing a validity check on the value of a_param. The validity check code determines whether or not the current value of a_param, as provided as input when the HLL program is executed, is one of the valid values from the drop-down menu. Example 2 shows example HLL program code generated in response to the graphical model not having a designer-specified value for a_param.

if strcmp (a_param, 'item 1')
a_param_idx=1;
elseif strcmp (a_param, 'item 2')
a_param_idx=2;
else
error ('invalid value specified for parameter a_param');
end Example 2

Figure 5:
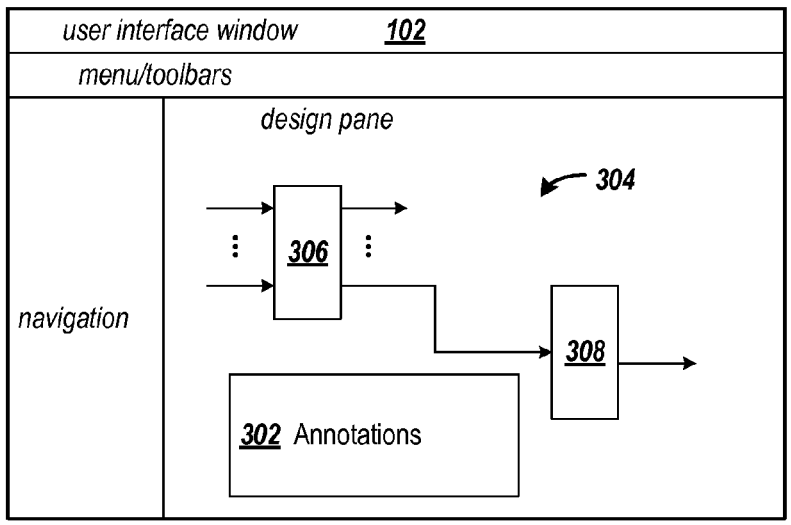

Annotations associated with a graphical model are also translated into HLL program code in accordance with one embodiment. FIG. 5 shows a user interface window in which annotations 302 are associated with a graphical model 304 that is shown with graphical objects 306 and 308. The annotations 302 are generally stored as an object that is associated with the graphical model for which the designer has entered the description. When translating a graphical mode, the translator reads the annotation associated with the model, if any, and generates a comment containing that annotation in the HLL code. The comment is placed in HLL code in proximity to the function which was generated from the model having the annotation. For example, the comment may be placed immediately before or after the program statement that declares the function. The particular syntax used to specify a comment is HLL dependent.

Figure 6:
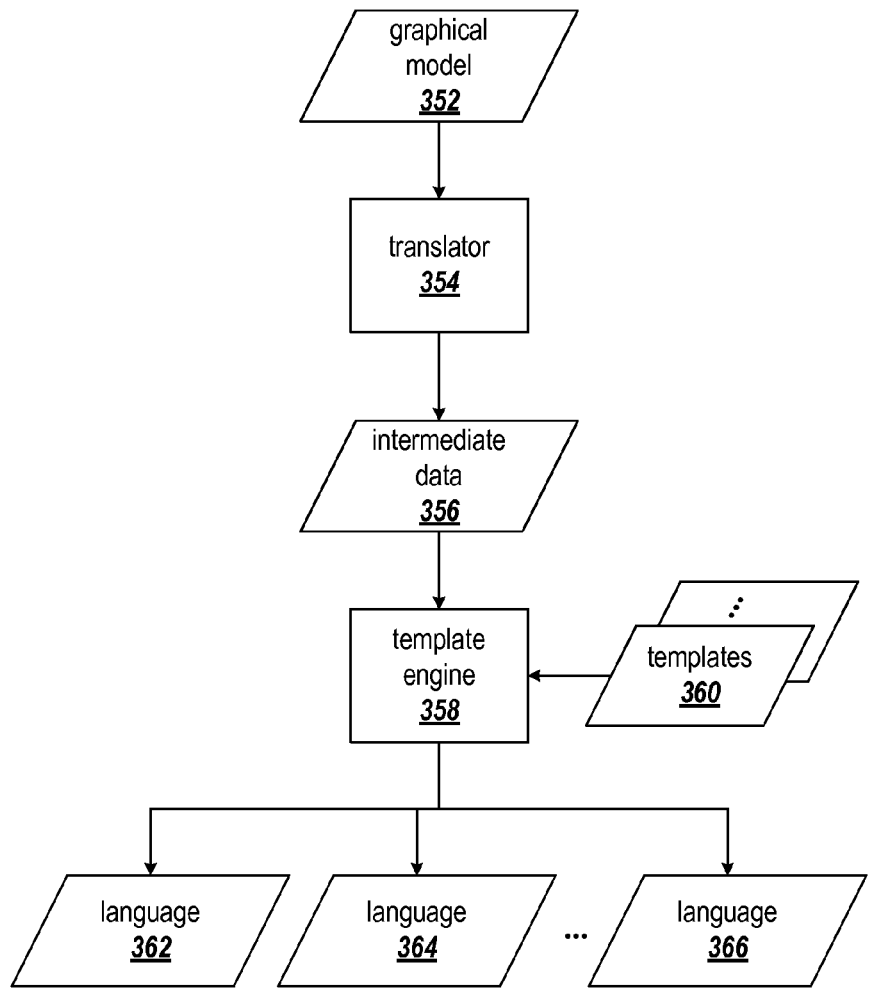
FIG. 6 shows a data flow in which a graphical model is translated into a selected target language.

In another embodiment, a graphical model may be translated into intermediate data, and the intermediate data may be used to generate programs in different HLLs. FIG. 6 shows a data flow in which a graphical model is translated into a selected target language.

A graphical model 352 is input for translation. The translator 354 translates the graphical model into intermediate data 356. The template engine 358 generates program code in a selected language using the intermediate data and the one of templates 360 for the selected language. The output is program code in the selected language. The program code in the different languages is shown as blocks 362, 364, and 366.

In one embodiment, the intermediate data is a nested look update table. Example 3 shows an example of a nested lookup table.

The intermediate data specifies an alternative graphical representation of the input graphical model 352. In the intermediate data shown in Example, 3, the operand on the left hand side of the "=>" operator is the name of an look up table entry, and the operand on the right hand side of the => operator is the value of the entry. Braces ("{ . . . }") designate a look up table, and square brackets ("[ . . . ]") designate an array.

```
{
  "name"=>"outer_subsystem",
  "type"=>"subsystem",
  "params"=>[
    {"name"=>"a"},
    {"name"=>"b"},
  ],
  "initialization"=>"c=a+b;",
  "ins"=>[
    {
      "type"=>"inport",
      "name"=>"in"
    },
  ],
  "outs"=>[
    {
      "type"=>"outport",
      "name"=>"out",
    },
  ],
  "sigs"=>[ ],
  "blocks"=>[
    {
      "type"=>"subsystem",
      "source"=>"inner_subsystem",
      "params"=>["a", "b"],
    },
  ],
  "subs"=>[
    {
      "type"=>"subsystem",
      "name"=>"inner_subsystem",
      "params"=>[
        {"name"=>"a"},
        {"name"=>"b"},
      ],
      "initialization"=>"d1=c*2+a;\n d2=c*3+b",
      "ins"=>[
        {
          "type"=>"inport",
          "name"=>"in"
        },
      ],
      "outs"=>[
        {
          "type"=>"outport",
          "name"=>"out",
        },
      ],
      "sigs"=>[
        {
          "type"=>"signal",
          "name"=>"sig",
        },
      ],
      "blocks"=>[
        {
          "type"=>"leafblock",
          "source"=>"Constant Multiplier",
          "params"=>[
            {
              "name"=>"const",
              "value"=>"d1",
            },
          ],
          "ins"=>["in"],
          "outs"=>["sig"],
        },
        {
          "type"=>"leafblock",
          "source"=>"Constant Multiplier",
          "params"=>[
            {
              "name"=>"const",
              "value"=>"d2",
            },
          ],
          "ins"=>["sig"],
          "outs"=>["out"],
        },
      ],
    },
  ],
}
```

Example 3

The templates 360 correspond to the possible target languages 362, 364, and 366. The templates contain the basic structural elements for the respective languages. For example, for M code, an M code template will have structures defined for "function" and other key word elements.

The template engine 358 follows the commands in the template 360 in extracting data from the intermediate data and generating program code in the proper format for the selected one of the language 362-366. Example 4 below shows a template for the MATLAB language. Using the intermediate data in Example 3 and the template from Example 4, the template engine 358 would generate the MATLAB code in Example 1. The template engine 358 generally reads the commands and queries from the template and processes those commands and queries in the specified order, outputting HLL program code as the commands and queries are processed.

In the example template, angle brackets ("< . . . >") designate a template command for the template engine. The "$" symbol specifies a query of the look up table and outputting of the data read from the lookup table to the HLL program file. The character strings in the template that precede and follow a query are also output to the HLL program file in the order in which they appear in the template. For example, in the following line in the template:

xBlock(str2func('$block.source'), the string, xBlock(str2func(' precedes the query, $block.source, and is output to the HLL program file before the data returned from the query. Likewise, the character string, '), is output to the HLL file following the output of the data returned from the query.

The brackets ("[ ]") in the template are special characters that signal to the template engine to optionally output the character(s) contained within the brackets to the HLL program file. The character(s) contained within the brackets will not be output when the brackets are contained in a for loop and it is the last iteration of that loop. For example, if <foreach> has three iterations and there is a [,] in the body of the <foreach> loop, the character "," will be outputted for the first and second iterations but not the third iteration.

```
<template fun_temp>
function $name(
    <foreach param of $params>
    $param.name [,]
    <endfor>)
    % initialization commands
    $initialization
    <foreach inport of $ins>
    $inport.name=xInport('$inport.name');
    <endfor>
    <foreach outport of $outs>
    $outport.name=xOutput('$outport.name');
    <endfor>
    <foreach sig of $sigs>
    $sig.name=xSignal( )
    <endfor>
    <foreach block of $blocks>
       <if $block.type=="subsystem">
          xBlock(str2func('$block.source'),
             {<foreach param of $block.params>
             $param [,]
             <endfor>
             });
       <else>
          xBlock('$block.source',
          {
          <foreach param of $blocks.param_map>
          '$param.name', $param.value [,]
          },
          {
          <foreach in of $blocks.ins>
          $in [,]
          },
          {
          <foreach out of $blocks.outs>
          $out [,]
          });
    <endfor>
    <foreach subfun of $subs>
       <inflate fun_temp $subfun>
    <endfor>
end % function $name
<endtemplate>
```

Example 4

Figure 7:
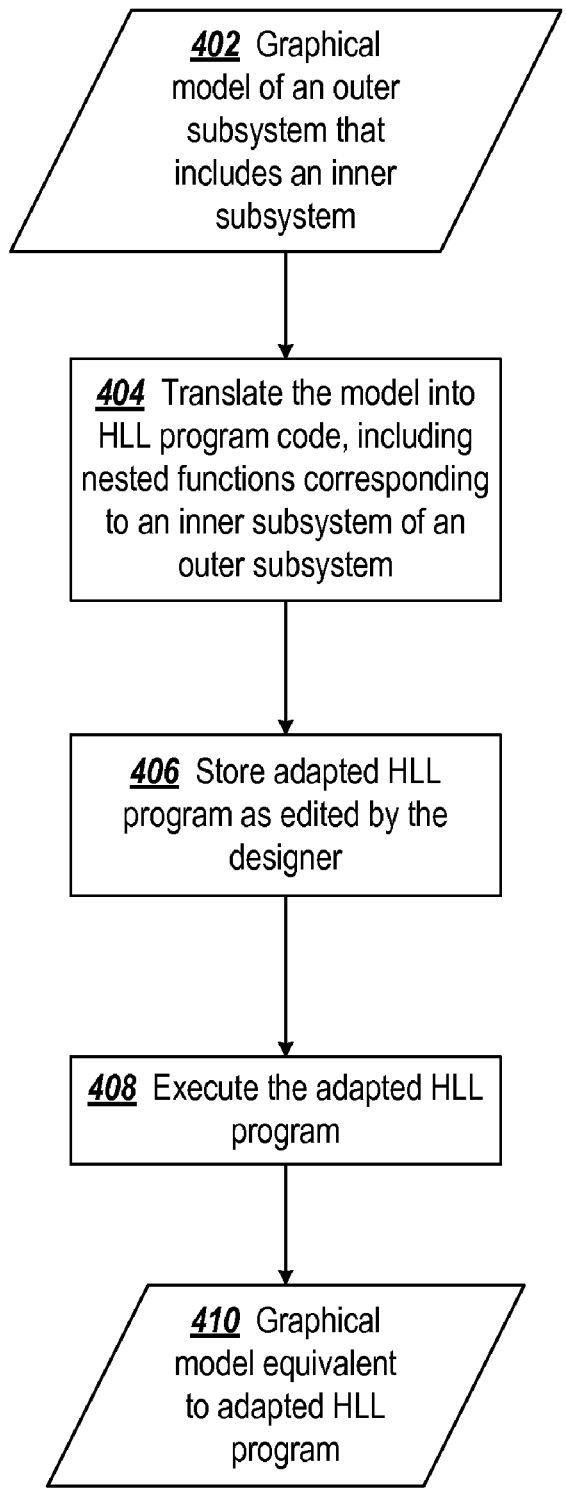
FIG. 7 is a flowchart of an example process for converting a graphical model into an HLL program in accordance with various embodiments of the invention.

FIG. 7 is a flowchart of an example process for converting a graphical model into an HLL program in accordance with various embodiments of the invention. A selected graphical model 402 is input for translation, where the selected model includes an outer subsystem and nested in the outer subsystem, an inner subsystem.

The selected model is translated into an HLL program at step 404. The HLL program includes a first function specified for the outer subsystem, and nested within the first function is a second function specified for the inner subsystem. The nesting of the second function within the first function allows the second function to reference the parameters of the first function, just as the outer subsystem passes parameters to the inner subsystem in the graphical model. The generated HLL program also includes code for setting parameter values and comments for generated functions based on designer-specified parameter settings and annotations in the graphical model.

Once translated, the designer may adapt or supplement the HLL program for use in a larger design. At step 406, the resulting HLL program is stored for future use, such as simulation or implementation.

In an example embodiment, the designer may execute the adapted HLL program with desired parameter values as shown at step 408. The output of the HLL program is another graphical model 410 that is equivalent to the adapted HLL program.

Figure 8:
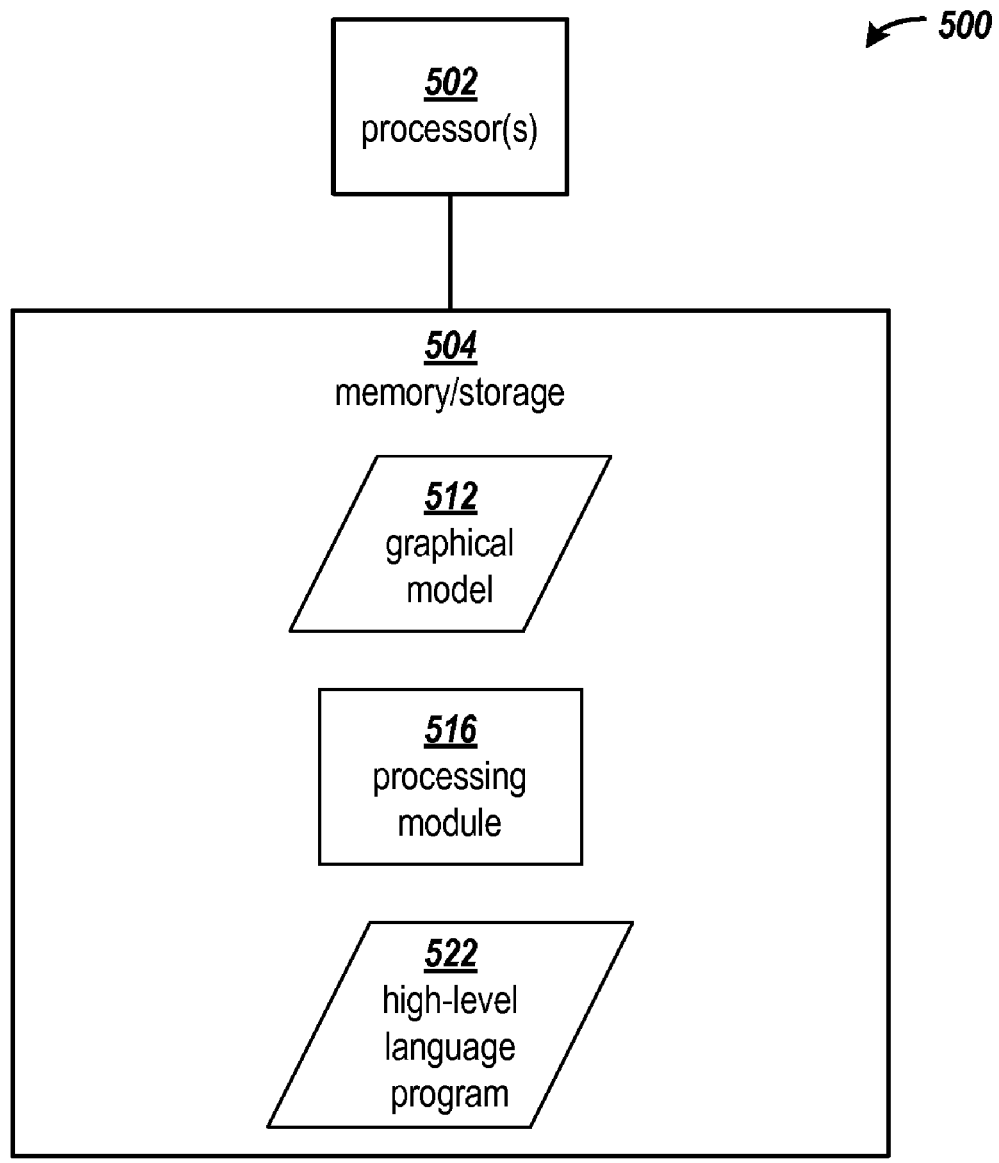
FIG. 8 is a block diagram of an example computing arrangement on which the processes described herein may be implemented.

FIG. 8 is a block diagram of an example computing arrangement on which the processes described herein may be implemented. Those skilled in the art will appreciate that various alternative computing arrangements, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

Computing arrangement 500 includes one or more processors 502 coupled to a memory/storage arrangement 504. The architecture of the computing arrangement depends on implementation requirements as would be recognized by those skilled in the art. The processor 502 may be one or more general purpose processors, or a combination of one or more general purpose processors and suitable co-processors, or one or more specialized processors (e.g., RISC, pipelined, etc.).

The memory/storage arrangement 504 is representative of hierarchical storage commonly found in computing arrangements. Such hierarchical storage typically includes multiple levels of cache memory, a main memory, and local and/or remote persistent storage such as provided by flash memory or magnetic disks (not shown). The memory/storage arrangement may include one or both of local and remote memory/storage, remote storage being coupled to the processor arrangement via a local area network, for example.

The processor arrangement 502 executes the software stored in memory/storage arrangement 504, and reads data from and stores data to the memory/storage arrangement according to the processes described above. An operating system (not shown) manages the resources of the computing arrangement. A graphical model 512 of a circuit block design is input to the processing module 516. The processing module is executed by the processor arrangement 502 and generates an HLL program 522 as described above. The HLL program may be an executable script or code in an HLL that can be compiled into machine executable code.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of processing an electronic circuit design, comprising:
inputting a first graphical model of an outer subsystem block of the design, the outer subsystem block including at least one parameter and at least one inner subsystem block, the inner subsystem block including at least one leaf block that specifies a function for applying to at least one input port value and producing an output port value;
translating by at least one programmed processor, the first graphical model of the outer subsystem block and the inner subsystem block into a high-level language (HLL) program and storing the HLL program by the computing arrangement, the HLL program including a declaration and specification of a first function corresponding to the outer subsystem block and within the specification of the first function a declaration and specification of a second function corresponding to the inner subsystem block;
selecting one of a plurality of templates corresponding to different target languages;
wherein the translating includes formatting the HLL program according to the selected template;
wherein the specification of the first function references the at least one parameter and specifies invocation of the second function, and the specification of the second function specifies invocation of a third function corresponding to the leaf block;
wherein the specification of the first function references at least one variable corresponding to the at least one parameter, and the at least one variable is referenced by at least one of the second and third functions; and
wherein the HLL program is executable to instantiate a second graphical model including the outer subsystem block, the inner subsystem block, and the leaf block consistent with an input value for the at least one parameter.

2. The method of claim 1, further comprising reading one or more values specified in the graphical model for one or more of the first set of parameters, respectively, and writing statements in the HLL program that assign the one or more values to one or more of the variables.

3. The method of claim 1, further comprising reading an initialization command specified in the graphical model for the outer subsystem block, and writing an initialization statement in the HLL program equivalent to the initialization statement after the declaration of the first function and before each other statement in the first function that depends on a result of the initialization statement.

4. The method of claim 1, further comprising reading a list of valid values in the first graphical model for at least one parameter of the first set of parameters, and writing statements in the HLL program that determine whether or not a value of a variable corresponding to the at least one parameter is consistent with the valid values specified in the first graphical model.

5. The method of claim 1, further comprising reading from the first graphical model a first annotation associated with the outer subsystem block and a second annotation associated with the inner subsystem block, and wherein the translating includes writing a first comment proximate a declaration of the first function in the HLL program and containing text from the first annotation, and writing a second comment proximate a declaration of the second function in the program and containing text from the second annotation.

6. A system for processing an electronic circuit design, comprising:
a processor arrangement;
a memory arrangement coupled to the processor arrangement, wherein the memory arrangement is configured with instructions that are executable by the processor arrangement for performing operations including:
inputting a first graphical model of an outer subsystem block of the design, the outer subsystem block including at least one parameter and at least one inner subsystem block, the inner subsystem block including at least one leaf block that specifies a function for applying to at least one input port value and producing an output port value;
translating the first graphical model of the outer subsystem block and the inner subsystem block into a high-level language (HLL) program and storing the HLL program, the HLL program including a declaration and specification of a first function corresponding to the outer subsystem block and within the specification of the first function a declaration and specification of a second function corresponding to the inner subsystem block;
selecting one of a plurality of templates corresponding to different target languages;
wherein the translating includes formatting the HLL program according to the selected template;
wherein the specification of the first function references the at least one parameter and specifies invocation of the second function, and the specification of the second function specifies invocation of a third function corresponding to the leaf block;
wherein the specification of the first function references at least one variable corresponding to the at least one parameter, and the at least one variable is referenced by at least one of the second and third functions; and
wherein the HLL program is executable to instantiate a second graphical model including the outer subsystem block, the inner subsystem block, and the leaf block consistent with an input value for the at least one parameter.

7. The system of claim 6, the operations further comprising reading one or more values specified in the first graphical model for one or more of the first set of parameters, respectively, and writing statements in the HLL program that assign the one or more values to one or more of the variables.

8. The system of claim 6, the operations further comprising reading an initialization command specified in the graphical model for the outer subsystem block, and writing an initialization statement in the HLL program equivalent to the initialization statement after the declaration of the first function and before each other statement in the first function that depends on a result of the initialization statement.

9. The system of claim 6, the operations further comprising reading a list of valid values in the first graphical model for at least one parameter of the first set of parameters, and writing statements in the HLL program that determine whether or not a value of a variable corresponding to the at least one parameter is consistent with the valid values specified in the first graphical model.

10. The system of claim 6, the operations further comprising reading from the first graphical model a first annotation associated with the outer subsystem block and a second annotation associated with the inner subsystem block, and wherein the translating includes writing a first comment proximate a declaration of the first function in the HLL program and containing text from the first annotation, and writing a second comment proximate a declaration of the second function in the HLL program and containing text from the second annotation.

11. An article of manufacture, comprising:
a storage device configured with executable instructions for processing an electronic circuit design, wherein the instructions when executed by one or more processors cause the one or more processors to perform operations including:
  inputting a first graphical model of an outer subsystem block of the design, the outer subsystem block including at least one parameter and at least one inner subsystem block, the inner subsystem block including at least one leaf block that specifies a function for applying to at least one input port value and producing an output port value;
  translating the first graphical model of the outer subsystem block and the inner subsystem block into a high-level language (HLL) program and storing the HLL program, the HLL program including a declaration and specification of a first function corresponding to the outer subsystem block and within the specification of the first function a declaration and specification of a second function corresponding to the inner subsystem block;
  selecting one of a plurality of templates corresponding to different target languages;
  wherein the translating includes formatting the HLL program according to the selected template;
  wherein the specification of the first function references the at least one parameter and specifies invocation of the second function, and the specification of the second function specifies invocation of a third function corresponding to the leaf block;
  wherein the specification of the first function references at least one variable corresponding to the at least one parameter, and the at least one variable is referenced by at least one of the second and third functions; and
  wherein the HLL program is executable to instantiate a second graphical model including the outer subsystem block, the inner subsystem block, and the leaf block consistent with an input value for the at least one parameter.

12. The article of manufacture of claim 11, the operations further comprising reading one or more values specified in the first graphical model for one or more of the first set of parameters, respectively, and writing statements in the HLL program that assign the one or more values to one or more of the variables.

13. The article of manufacture of claim 11, the operations further comprising reading an initialization command specified in the graphical model for the outer subsystem block, and writing an initialization statement in the HLL program equivalent to the initialization statement after the declaration of the first function and before each other statement in the first function that depends on a result of the initialization statement.

14. The article of manufacture of claim 13, the operations further comprising reading a list of valid values in the graphical model for at least one parameter of the first set of parameters, and writing statements in the HLL program that determine whether or not a value of a variable corresponding to the at least one parameter is consistent with the valid values specified in the first graphical model.

15. The article of manufacture of claim 13, the operations further comprising reading from the graphical model a first annotation associated with the outer subsystem block and a second annotation associated with the inner subsystem block, and wherein the translating includes writing a first comment proximate a declaration of the first function in the HLL program and containing text from the first annotation, and writing a second comment proximate a declaration of the second function in the HLL program and containing text from the second annotation.

* * * * *